(12) United States Patent
Nikankin

(10) Patent No.: US 8,925,056 B2
(45) Date of Patent: Dec. 30, 2014

(54) UNIVERSAL MANAGEMENT OF USER PROFILES

(71) Applicant: Andrey N. Nikankin, Sankt-Petersburg (RU)

(72) Inventor: Andrey N. Nikankin, Sankt-Petersburg (RU)

(73) Assignee: Rawllin International Inc., Tortola (VG)

( * ) Notice: Subject to any disclaimer, the term of this patent is extended or adjusted under 35 U.S.C. 154(b) by 96 days.

(21) Appl. No.: 13/846,609

(22) Filed: Mar. 18, 2013

(65) Prior Publication Data

US 2014/0282943 A1  Sep. 18, 2014

(51) Int. Cl.
*G06F 21/00* (2013.01)
*H04L 29/06* (2006.01)

(52) U.S. Cl.
CPC .................................. *H04L 63/0884* (2013.01)
USPC ............................................. 726/6; 713/185

(58) Field of Classification Search
USPC .............................................. 726/6; 713/185
See application file for complete search history.

(56) References Cited

U.S. PATENT DOCUMENTS

| 7,562,229 | B2 | 7/2009 | Circenis et al. | |
| 7,937,456 | B2 * | 5/2011 | McGrath | 709/220 |
| 8,095,654 | B2 | 1/2012 | Morimoto | |
| 2009/0083269 | A1 * | 3/2009 | Artz et al. | 707/6 |
| 2011/0060845 | A1 * | 3/2011 | Jungck | 709/245 |
| 2013/0268766 | A1 * | 10/2013 | Schrecker | 713/185 |

* cited by examiner

*Primary Examiner* — Peter Shaw
*Assistant Examiner* — Ali Shayanfar
(74) *Attorney, Agent, or Firm* — Amin, Turocy & Watson, LLP

(57) ABSTRACT

An authentication component to authenticate users can generate a unique identification for a user based on device characteristics, operating characteristics, and the like. The authentication component can provide authentication of a user to applications. Applications can provide a user with personalized content based on the authentication.

22 Claims, 13 Drawing Sheets

UNIVERSAL MANAGEMENT OF USER PROFILES

TECHNICAL FIELD

This application generally relates to authentication of devices in a network and to universal management of user profiles.

BACKGROUND

User profiles are generally created when a user registers with an application, such as a social network or an online retailer. Such profiles typically require a user to log with a password and user name. For example, an online retailer utilizing a network site, e.g., a website, can require a user to log in to a profile managed by the online retailer.

Websites can share user accounts to identify a user. For example, a website can opt in to a system. Multiple websites can utilize a single user identification to allow a user to interact with the multiple websites (e.g., social networking features).

The above-described context surrounding conventional use of user profiles is merely intended to provide an overview of some conventional systems, and is not intended to be exhaustive.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

An authentication device can manage user profiles and authenticate users who are associated with a client device. The authentication device can provide personalized content and access to recourses. The authentication device can automatically generate a globally unique identifier for a user (GUUID). The GUUID can be a unique identification for a user relative to GUUIDs of other users. The authentication device can generate the GUUID based on various parameters.

The authentication device can communicate a GUUID with any application or service on a client device or a network, such as a website. A GUUID can be stored by a client and/or within a database of other GUUIDs on a server. Websites, applications, and/or other services can utilize a GUUID to forgo a typical log in process for authentication.

The following description and the annexed drawings set forth in detail certain illustrative aspects of the disclosed subject matter. These aspects are indicative, however, of but a few of the various ways in which the principles of the various embodiments may be employed. The disclosed subject matter is intended to include all such aspects and their equivalents. Other advantages and distinctive features of the disclosed subject matter will become apparent from the following detailed description of the various embodiments when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
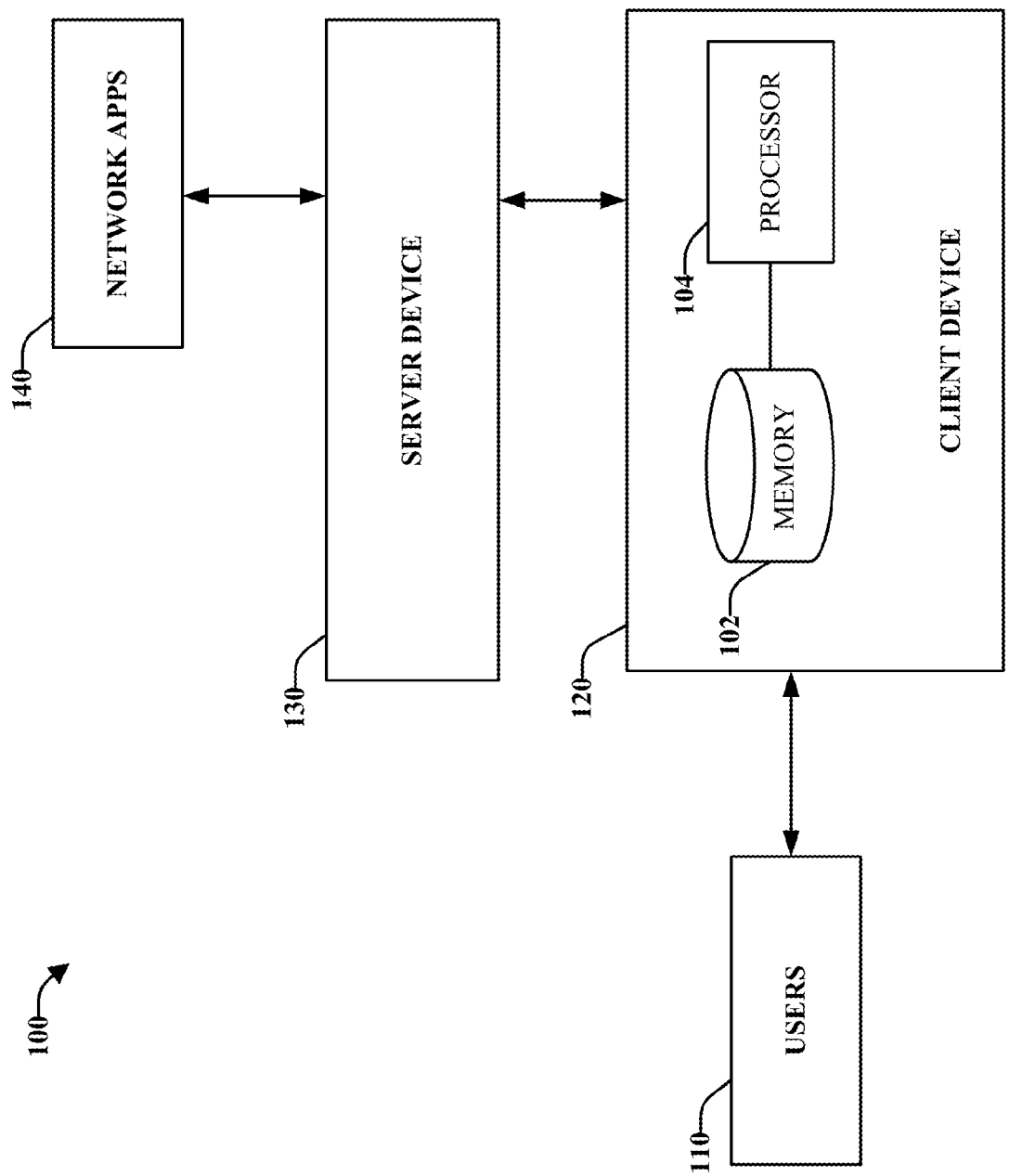
FIG. 1 illustrates a high level functional block diagram of an authentication system in accordance with various embodiments.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

References to a "client(s)," a "client device(s)," "server(s)," and the like can refer to various electronic computing devices. These devices can include personal computers, laptop computers, desktop computers, tablets, smart phones, personal digital assistant (PDA), gaming counsels, set top boxes, internet enabled media players, servers, databases, and the like.

References to "authentication credentials," "credentials," "sets of credentials," "identification tokens," "GUUID," "CUUID," and the like can refer to a globally unique ID. In various aspects, the terms can be used interchangeably, unless contexts suggests otherwise. In another aspect, "characteristic(s)," "identifier(s)," and the like are used interchangeably herein, unless context suggests otherwise, to refer to data indicative of various states of devices, metrics of devices, and the like.

Referring now to the drawings, with reference initially to FIG. 1, presented is a system 100 that can facilitate authentication of client browsers through a generated GUUID. Aspects of the systems, apparatuses or processes explained herein can constitute machine-executable component embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. System 100 can include a client device 120, a server device 130 and network applications 140. The client device 120 can comprise memory 102 for storing computer executable components and instructions. A processor 104 can facilitate operation of the computer executable components and instructions by the system 100. It is noted that the server device 130 can comprise one or more processors and/or memories. It is further noted that the system 100 can comprise one or more client devices, server devices, and/or network applications.

System 100 is configured to generate a GUUID based on one or more identifiers, tags, and the like. The client device 120 and/or the server device 130 can store the GUUID. As used herein, tags and/or identifiers can comprise a piece of information, such as an internet bookmark, a digital image, a computer file, browser version, hypertext transfer protocol (HTTP) cookies, local shared objects (e.g., flash cookies), browser plug-ins, time zone data, display settings (screen size, zoom settings, color depth settings, system fonts, etc.), cookie settings, browser homepage settings, frequently used applications, stored search strings, key stroke data, limited supercookie tests, HTML5 Geo Location, global satellite positioning (GPS) data, geographical internet protocols data (e.g., GeoIP), platform specific data, phone numbers, service provides, device images (e.g., such as a computer file comprising device settings, e.g., a system restore image), and the like. It is noted that identifiers can be employed through various markup language documents, such as HTML, HTML5, extensible markup language (XML), extensible hypertext markup language (XHTML). In an aspect, identifiers and/or tags help to describe the information to which they are assigned. For example, catalogue items associated with a network site, e.g., a World Wide Web page, often include descriptions to inform user's about attributes of the item.

In an embodiment, the client device 120, the server device 130, and the network applications 140 can be connected through a communication frame work (such as the internet, intranet, satellite, cellular services, broadband connections, and the like). It is noted that although the embodiments and examples will be illustrated with respect to an architecture employing HTML pages and the network site, e.g., a World Wide Web page, the embodiments and examples may be practiced or otherwise implemented with any network architecture utilizing clients and servers, and with distributed architectures, such as but not limited to peer to peer systems.

In various embodiments, a user 110 can communicate with the client device 120 (e.g., through an interface). The client device 120 can execute applications such as internet browsers and the like. The client device 120 can communicated with the network applications 140 (e.g., websites) hosted by the server device 130, for example. In an aspect, the server device 130 can store data and/or provide data to the client device 120. The client device 120 can provide data to the user 110 (e.g., through an interface).

In an aspect, the client device 120 can provide identifiers to the server device 130. The server device 130 can generate a GUUID based on the provided identifiers. In an aspect, the client device 120 can provide the identifiers comprising geographical identifiers. The client device 120 can determine geographic identifiers via various sources, such as HTML5 geographic application program interface (Geo API), GPS information, internet protocol (IP) address, a users calendar, cell phone triangulation, geographic routes (e.g., planned routs/destinations in a GPS device), manually entered data (e.g., via the user 110), server access patterns, stored location data (e.g., mailing address stored in a browser), and the like.

In another aspect, the client device 120 can gather identifiers. The client device 120 can generate a GUUID to be stored by the client device 120 (such as a client side unique identifier—CUUID), for example, in the memory 102. The client device 120 can communicate identifiers and/or a CUUID to the server device 130 (e.g., a previously stored CUUID). The server device 130 can generate a platform based unique identifier (herein referred to as a PUUID) based on the identifiers, such as user agent identification, HTTP_ACCEPT headers, browser plug-ins, time zone associated with the client device, screen size and color depth of the client device, fonts associated with the client device, cookie settings (e.g., general cookies enabled/disabled settings, specific cookies that are enabled/disabled, etc.), LST, geographic location, IP provider, OS specific data (e.g., OS name, version, build number, etc.), or platform specific data, and/or the CUUID. In an aspect, a PUUID can correspond to one or more GUUID. For example, multiple users can access one or more respective client devices, the respective client devices can provide identifiers and the server device 130 can generate identical PUUIDs for the respective client devices. The server device 130 can generate a GUIID for each respective client device. In another aspect, the PUUID can be bonded to one or more GUUID, such as through linking the PUUID to one or GUUIDs in a database via flags, tokens, and the like.

In various embodiments, the server device 130 can generate a GUUID based on one or more of a CUUID, PUUID, and/or identifiers. The server device 130 can determine whether a GUUID exists for the client device 120. In an aspect, the server device 130 can update a GUUID based on identifiers (e.g., updated plug-ins, operating system versions, browser versions, etc.). For example, the client device 120 can communicate an update request to the server device 130. The update request can comprise data indicating that an identifier (such as a geographic location, browser version, etc.) has changed. In an aspect, the server device 130 can alter a stored GUUID based on the update request. In another aspect, the server device 130 can communicated the altered GUUID to the client device 120 and/or the network applications 140. Accordingly, alteration of identifiers can be monitored such that the client device 120 can be authenticated when identifiers are modified.

In another aspect, the server device 130 can generate a new GUUID if a GUUID is determined not to exist for the user 110. The server device 130 can communicate the GUUID to the client device 120 and the client device 120 can store the GUUID, for example, as a CUUID. It is noted that various implementations can generate one or more IDs used to generate, alter, and/or update GUUIDs.

In various embodiments, the server device 130 can communicate a GUUID to the network applications 140. The network applications 140 can verify a user via a GUUID. In an aspect, the network applications 140 can provide access to services, content, and the like to the user 110 based on the client device 120's GUUID.

In an aspect, installation of third party cookies, registration to third party systems, and/or log in information can be bypassed based on various aspects disclosed herein. In another aspect, the user 110 (and/or the client device 120) can be authenticated and personalized advertisements, content, and access to online services (e.g., online retailers) can be achieved without a log in and/or registration process. As an example, the user 110 can be authenticated based on the GUUID. It is noted that the server device 130 can provide HTTP specific headers, and the like, to various aspects of the system 100.

It is noted that the user 110 can opt out of one or more aspects of the system 100. In an implementation, the client device 120 can received input from the user 110. The input can include data indicative of the user's 110 desire to opt out of one or more aspects of the system 100. As an example, the user 110 can provide input to opt out of the system 100 from generating a GUUID based in part on browsing history. The system 100 can disable gathering and/or communication of browsing history associated with the user. It is noted that a GUUID can be generated based in part on information indicative of a user opting out of one or more aspects of the system 100. In another example, the user 110 can completely opt out of the system 100.

Figure 2:
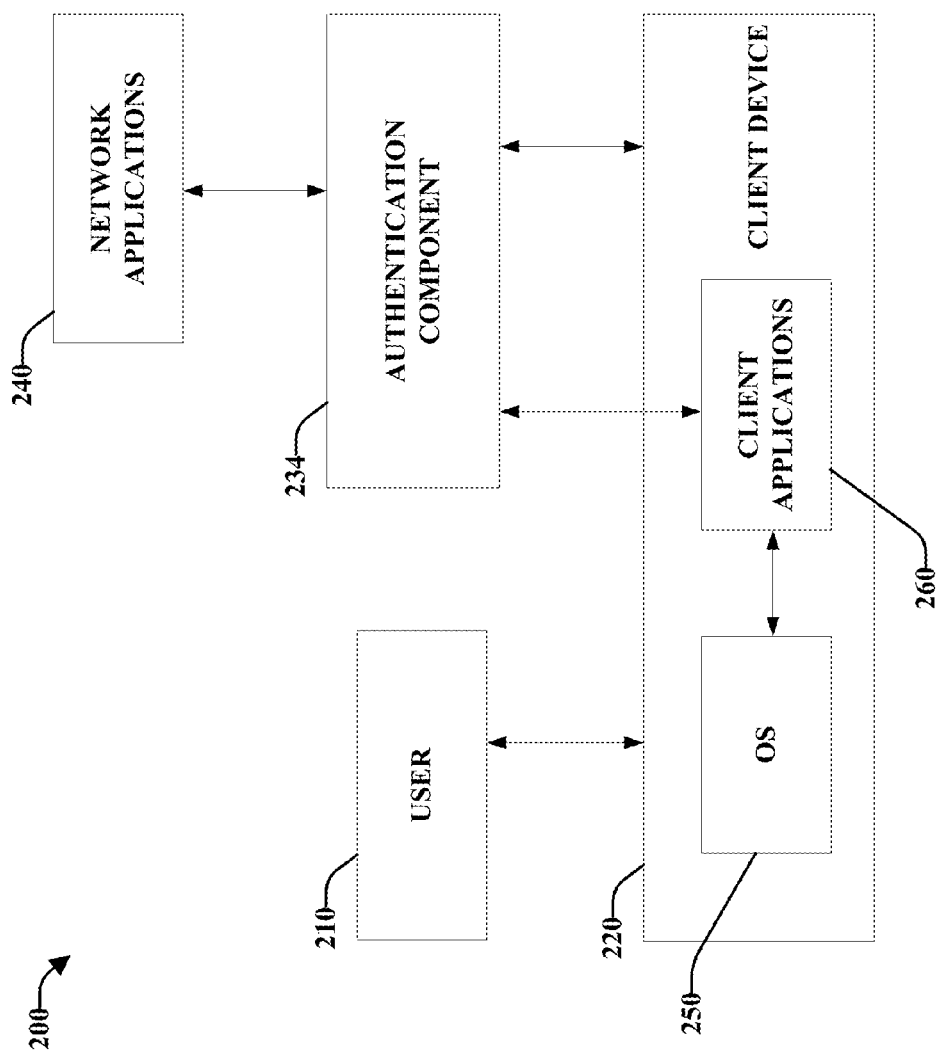
FIG. 2 illustrates a high level functional block diagram of an authentication system including an authentication component in accordance with various embodiments.

Referring now to FIG. 2, presented is a system 200 that can facilitate authentication of client browsers. System 200 can include a client device 220, an authentication component 234, and network applications 240. In an aspect, client device 220 can comprise an operating system (OS) 250 and client applications 260. A user 210 can communicate with the client device 220. The client device 220 can communicate with the authentication component 234, and the network applications 240. It is noted that various other components can be comprised in the system 200. While various components, applications, and/or devices are shown as separate entities, it is noted that the various components, applications, and/or devices can be comprised in one or more devices. As an example, the authentication component 234 can be comprised in the client device 220, a server (e.g., the server device 130), in multiple client and/or server devices, across one or more client and/or server devices, and the like.

The client device 220 can be a personal computer, lap top computer, tablet computer, smart phone, PDA, and the like. In an aspect, the client device 220 can implemented the OS 250. The OS 250 can facilitate various aspects of the system 200. As an example, the OS 250 can facilitate aspects of the client applications 260. It is noted that the client device 220 can include one or more operating systems (e.g., a dual booting device).

In an aspect, the authentication component 234 can communicate to the client applications 260. As an example, the authentication component 234 can gather identifiers from the client applications 260 (e.g., browsers, etc.). In an aspect, the authentication component 234 can gather information related to the client device 220, OS 250, and/or the client applications 260.

In various implementations, the authentication component 234 receives identifiers, including geographical identifiers, identifiers related to the OS 250, identifiers related to the client application 260, identifiers related to the client device 220, and the like. In an example, the authentication component 234 can gather a set of unique identifiers. The authentication component 234 can generate a GUUID based on the set of identifiers. In another example, the client device 220 can generate a GUUID and can communicate the GUUID to the authentication component 234. It is noted that GUUIDs can be stored on a network (e.g., the server device 130) and/or on the client device 220. As used herein, a CUUID is a GUUID stored on a client device.

In an implementation, the authentication component 234 can generate a PUUID for a client devices based on platform specific identifiers. In an aspect, a PUUID can comprise information to identify a particular client device uniquely. The information can include various identifiers, such as geographic location identifiers, IP addresses, OS 250 identifiers (e.g., version, kernel number, etc,), hardware identifiers (e.g., chip set, memory device, interface devices, etc.), and the like.

In an aspect, the authentication component 234 can generate a GUUID associated with the user 210. It is noted that a single client device can be associated with multiple users. As an example, a PUUID can be associated with the client device 220. Multiple users can interact with the client device 220 and share a common PUUID. The authentication component 234 can determine a GUUID for each user associated with the PUUID. In an example, each GUUID can be a unique ID based on respective users and/or PUUIDs that is stored on the client device 320. In an example, multiple users can have device and/or user settings that are unique to each user who interacts with the client device 320 (e.g., user name, browser bookmarks, browser homepage, etc.).

The authentication component 234 can determine whether a GUUID is associated with a PUUID. In an example, the authentication component 234 can determine if a GUUID is associated with a PUUID and if the PUUID relates to the user 210 (e.g., GUUID matches a received CUUID). As an example, multiple users can interact with the client device 220. The authentication component 234 can determine an identification of a user based on identifiers, such as GUUIDs, search history, account information (e.g., OS 250 profiles), image recognition (e.g., images captured by a device such as a web camera), key strokes (e.g., frequency of key strokes), interaction with client applications 260, interaction with network applications 240 (e.g., email services), and the like.

In an aspect, the network applications 240 and/or the client applications 260 can authenticate a user based on a GUUID. In another aspect, conventional authentication techniques (e.g., log-in, password protected, etc,) can be utilized by users and/or in conjunction with various aspects disclosed herein.

In various embodiments, the client device 220 can send a CUUID to the authentication component 234. The authentication component 234 can authenticate the client device 220 based on the CUUID. For example, the authentication component 234 can compare device characteristics and/or OS characteristics to characteristics of a GUUID, for example a GUUID stored in a database. In one aspect, the authentication component 234 can determine whether a geographic location of the client device 220 matches a geographic location associated with the GUUID.

In another aspect, a set of credentials (e.g., GUUID) can be entered in connection to the client device 220 (device level authentication) or a set of credentials can be entered to the client device 220 in connection with the operating system 250 (OS level authentication). In an aspect, the set of credentials can be used (if chosen to do so) by any network application 240 and/or any client application 260. In one aspect, the set of credentials can be utilizes as default authentication.

In an example, the authentication component 234 can determine to expand a set of identifiers used to generate IDs (e.g., GUUID, CUUID, PUUID) based on a number of PUUID being associated with a threshold number of GUUIDs. For example, each PUUID can be associated with one or more GUUID. As a number of devices in the network increase, more devices can have a common PUUID. In one aspect, when an amount of GUUIDs associated with a single PUUIDs is over a threshold a system can suffer from an increased latency and/or increased complexity in generating and maintaining GUUIDs. As such, the authentication component 234 can determine to alter a set of identifiers used to generate IDs. In an aspect, the authentication component 234 can determine which identifiers to use in order to reduce and/or minimize a number of devices associated with a single PUUID.

Figure 3:
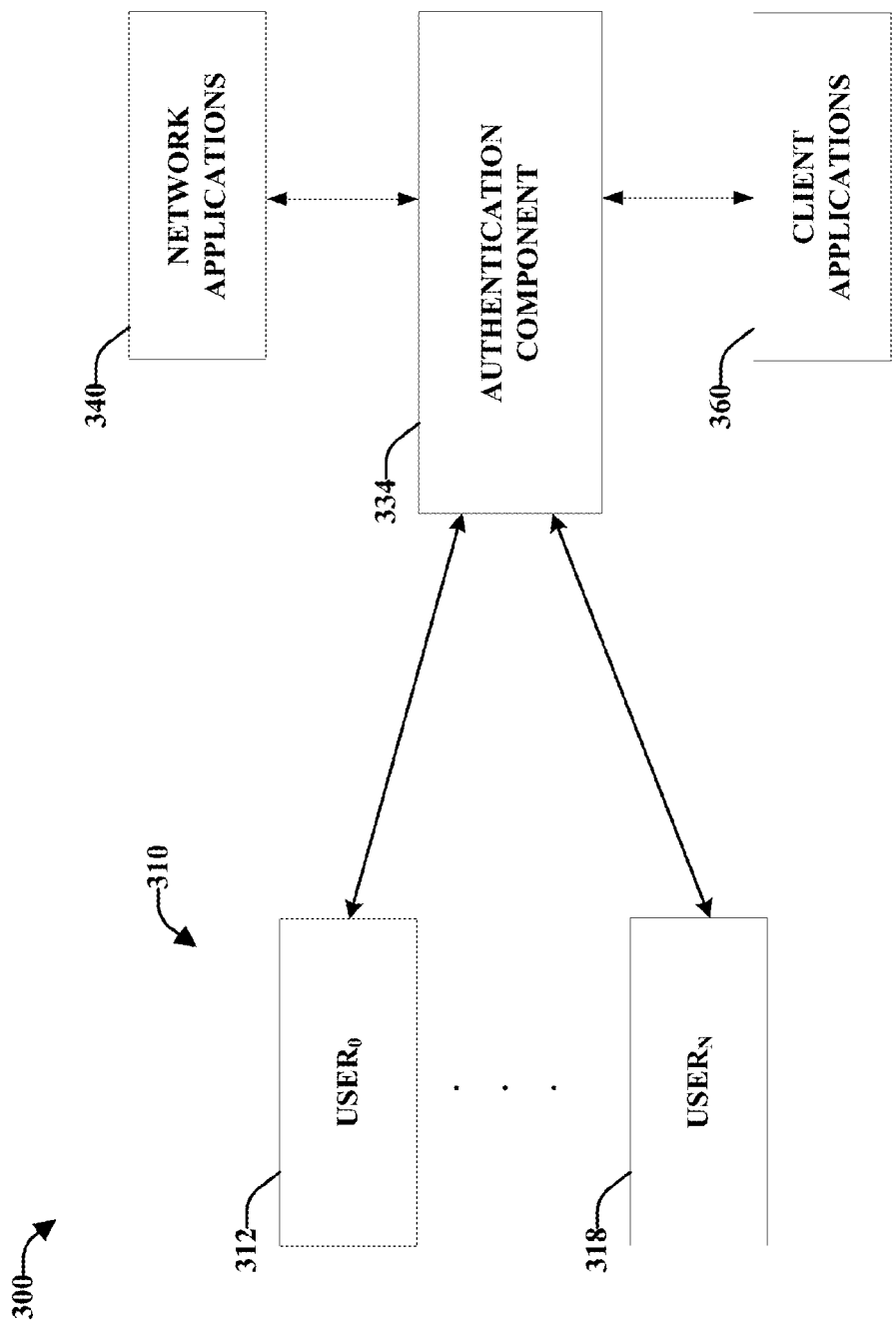
FIG. 3 illustrates a high level functional block diagram of an authentication system including a set of users in accordance with various embodiments.

Turning now to FIG. 3, presented is another non-limiting embodiment of a system 300 that facilitates authentication of users in accordance with one or more embodiments. System 300 can include a set of N users 310, where N is a number, an authentication component 334, network applications 340, and client applications 360. The authentication component 334 can authenticate the set of users 310. The authentication component 334 can communicated authentication to the network applications 340. The network applications 340 can provide respective users (e.g., User$_0$ 312 to User$_N$ 318) of the set of users 310 access to personalized content, personalized advertisement, and the like.

In an aspect, the authentication component 334 can generate a set of at least N GUUIDs (e.g., GUUID$_0$, GUUID$_{0+1}$ ..., GUUID$_{N-1}$, GUUID$_N$) respectively for each user of the set of users 310 (User$_0$ 312, User$_{0+1}$ ..., User$_{N-1}$, User$_N$ 318). In an aspect, the authentication component 334 can generate GUUIDs at an OS and/or device level. In an aspect, an OS and/or device level can comprise a level of a computer hierarchy. In an aspect, the GUUID can be independent of any specific browser version, OS version, and/or the like. In another aspect, the GUUID can be communicated to client applications 360 and/or network applications 340. It is noted that a users can have multiple associated GUUIDs. For example, a user can have a GUUID on one or more computers (e.g., a home computer, a work computer, a cellular phone, etc.).

In an embodiment, the authentication component 334 can store (and/or instruct a client device to store) GUUIDs for the set of users 310. For example, the GUUIDs can be stored in any possible storage, such as cookies, silverlight isolated storage, storing cookies in red green blue (RGB) values of auto-generated force-cached, portable network graphics (PNGs) using markup language for structuring and presenting content (e.g., HTML5), canvas tag to read pixels (e.g., cookies) back out, web history cookies, HTTP ETag stored cookies, web cache stored cookies, name caching, operating system information, browser user data, HTML5 session storage, local storage, global storage, database storage (e.g., HTML5 database storage), user agent data, HTTP_ACCEPT Headers, browser plug-ins local shared objects, HTML global storage, HTML local storage, databases (e.g., on a server device), and the like. In another example, individual user devices can store their respective GUUIDs as CUUIDs, for example, in memory on a client device. It is noted that a client device can store multiple CUUIDs for different users utilizing a single client device.

In an aspect, the authentication component 334 can update GUUIDs based on updated data. For example, an OS of a client device associated with the user$_0$ 312 can be updated. The authentication component 334 can restore a CUUID based on an associated $GUUID_0$. In another aspect, the authentication component 334 can update CUUIDs and GUUIDs based on altered identifiers (e.g., plug-ins, OS versions, browser versions, etc.).

In various embodiments, the authentication component 334 can authenticate users based on GUUIDs and/or CUUIDs. As an example, a user of the set of users 310 can send a request to a server device. The request can include metadata and/or a GUUID. The authentication component 334 can generate a PUUID, compare the received GUUID to a set of GUUIDs associated with the generated PUUID, and verify accuracy of identifiers based on the GUUID.

In an aspect, the authentication component 334 generates GUUIDs based on identifiers. In accordance with various aspects of this discloser, identifiers can include user agent information, HTTP headers, browser plug-ins, time zone of client device, client device display settings (e.g., screen size, color, brightness, desktop wall paper, display themes etc.), system fonts, browser settings (e.g., cookies enabled), limited supercookie tests, geographic location (HTML5 Geo Location, GeoIP, GPS, etc.), OS name, platform specific identifiers (e.g., device ID, IP address, power settings, etc.), browser specific identifiers (e.g., automatic update enabled, home page, bookmarks, etc.), key strokes (e.g., rate of each users key strokes), phone number, routing number, and the like.

In an aspect, the authentication component 334 can generate GUUIDs such that each GUUID is globally unique. In an example, several identifiers can be common between one or more GUUID. The authentication component 334 can be configured to determine unique GUUIDs based on a minimum threshold level of identifiers and/or a maximum number of threshold identifiers. In another aspect, the authentication component 334 can be configured to determine a number M of minimum identifiers need to generate unique GUUIDs. It is noted that the system can alter M as a number of GUUIDs alters. In an aspect, as M is altered, the system can alter GUUIDs such that each GUUID is associated with no more than M identifiers. However, in other implementations, only newly generated GUUIDs and/or altered GUUIDs can be constricted to the M identifiers.

In various embodiments, the authentication component 334 can determine which identifiers to utilize to generate the GUUID. In an aspect, the authentication component 334 can determine which identifiers to use to minimize a length of a GUUID (e.g., minimize bits needed). In another aspect, the authentication component 334 can select identifiers based on determining which identifiers will yield unique GGUIDs. It is noted that the authentication component 334 can select identifiers based on a virtually any desired metric.

In various embodiments, the authentication component 334 can generate a GUUID as a unique string of data. It is noted that the application component 334 can generate a GUUID via various coding, transformation, quantization, and/or mapping techniques. As an example, various identifiers can be converted into sets of bits. The sets of bits can be combined to form the GUUID.

In order to provide for or aid in the numerous inferences described herein (e.g., generating GUUIDs, selecting identifiers, determining a number of identifiers, etc.), the authentication component 334 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, such as by $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority. Any of the foregoing inferences can potentially be based upon, e.g., Bayesian probabilities or confidence measures or based upon machine learning techniques related to historical analysis, feedback, and/or other determinations or inferences.

Figure 4:
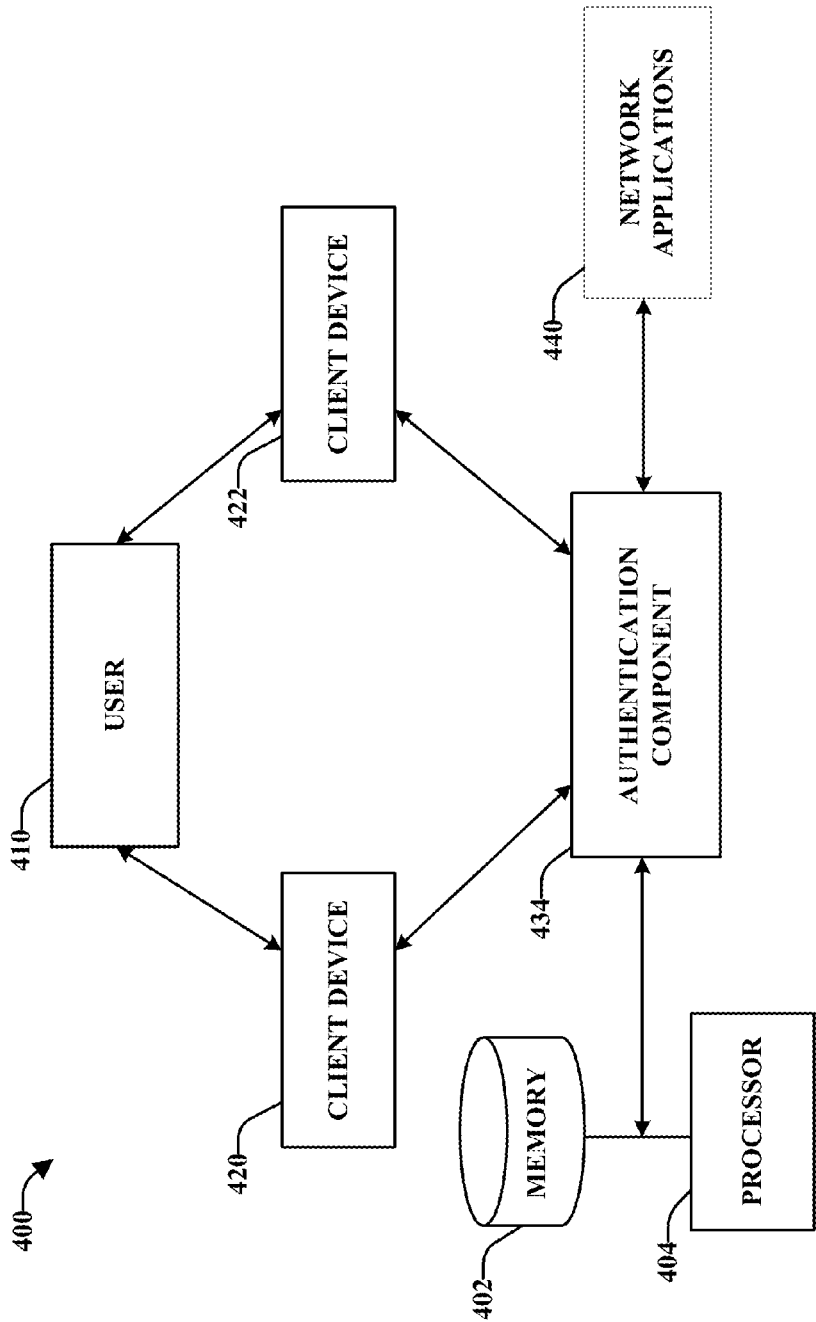
FIG. 4 illustrates a high level functional block diagram of an authentication system including a user associated with multiple devices in accordance with various embodiments.

Turning now to FIG. 4, presented is another non-limiting embodiment of a system 400 that facilitates authentication of users in accordance with one or more embodiments. System 400 can include a memory 402, a processor 404, a client device 420, a client device 422, an authentication component 434, and network applications 440. In particular, a user 410 can provide input to the client device 420 and the client device 422. The client device 420 and the client device 422 can communicate with the authentication component 434. It is note that the application component 434 can be implemented on one or more of the client devices 420, 422, and/or a server device (e.g., server device 130). The authentication component 434 can communicate with a memory 402, for storing computer executable components and instructions, and a processor 404. The processor 404 can facilitate operation of the computer executable components and execute instructions generated by the system 400.

The user 410 can utilize the client device 420 and the client device 422. In an aspect, the client devices 420, 422 can comprise one or more computers, tablet computers, and the like. As an example, the client device 420 can be a home computer and the client device 422 can be a work computer.

In various embodiments, the authentication component 434 can generate one or more GUUID associated with the user 410. In an aspect, the authentication component 434 can generate a first GUUID associated with the user 410 based and the client device 420, and can generate a second GUUID associated with the user 410 based on the client device 422. It is noted that the GUUIDs can be generate in accordance with various aspects presented herein.

In another aspect, the authentication component 434 can correlate the first GUUID and the second GUUID. Correlating the first GUUID and the second GUUID can comprise determining a relationship between the first and second GUUID, such as an identifier specific to the user. In an aspect, the relationship can be manually entered and/or dynamically determined. In another aspect, the relationship can be determined based on access to various network applications (e.g., social network accounts, email accounts, and the like).

In another embodiment, the authentication component 434 can generate a single GUUID associated with the user 410 and both client devices 420, 422. The authentication component 434 can determine a relationship between the client device 420, the client device 422, and the user 410. The authentication component 434 can generate the GUUID based on specific client device information, and/or various other identifiers. It is noted that the GUUID can be manually linked and/or automatically linked. In an aspect, the network application 440 can utilize the GUUID to provide personalized content and/or access to the client devices 420, 422.

In view of the example system(s) and apparatuses described above, example method(s) that can be implemented in accordance with the disclosed subject matter are further illustrated with reference to flowcharts of FIGS. 5-11. For purposes of simplicity of explanation, example methods disclosed herein are presented and described as a series of acts; however, it is noted that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages herein described.

Figure 5:
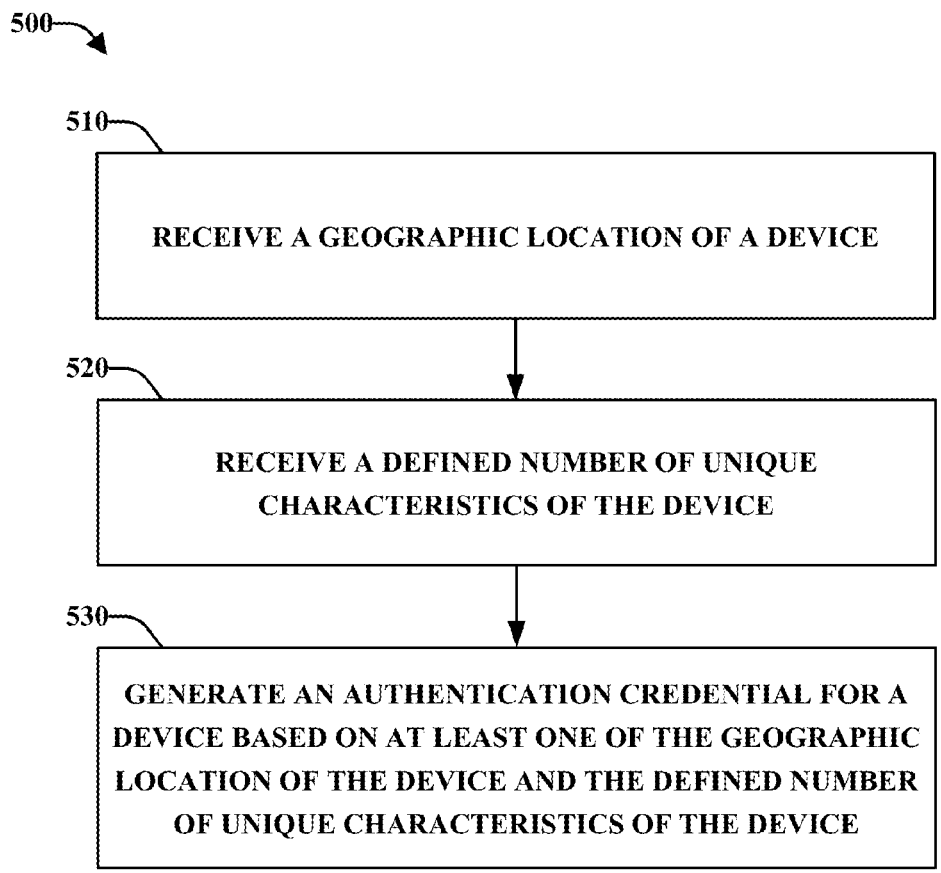
FIG. 5 illustrates a flow diagram of facilitating global authentication of a device in accordance with various embodiments.

Turning to FIG. 5, with reference to FIGS. 1-4, there illustrated is an exemplary method 500 to generate unique authentication credentials (e.g., GUUID). In an aspect, method 500 can generate authentication credentials associated with one or more devices (e.g., client device 120, 220, etc.). In another aspect, the authentication credentials can be maintained by a system and can provide an efficient, low cost means of authentication. It is noted that efficiency(ies) of method 500 results from using various aspects of this disclosure.

At 510, a geographic location of a device can be received. For example, an authentication component can receive a geographic location of a client device. It is noted that various techniques can be utilized receive the geographic location. In an aspect, a geographic location can be represented via HTML5, GPS, an IP address, and the like.

At 520, a defined number of unique characteristics of a device can be received. In an example, an authentication device can receive characteristics of a device (e.g., via a client device). In an aspect, the characteristics of the device can comprise at least one of data describing operating systems of the device, display setting of the device, hardware of the device, application settings of the device, or internet protocol address of the device. It is noted that various metrics can be comprised by the characteristics, as described herein.

At 530, authentication credentials can be generated for a device based on at least one of the geographic location or the defined number of unique characteristics of the device. In an aspect, the authentication credentials can comprise a GUUID, CUUID, and the like. It is noted that various embodiments disclosed here can provide means for generating the authentication credentials. In one aspect, the authentication credentials can be globally unique credentials (e.g., unique among any other authentication credentials related to other devices, and/or the device).

It is noted that the authentication credentials may be entered in connection with the device itself (device level authentication) and/or may be entered to the device in connection with an operating system of the device (OS level authentication). It is further noted that the authentication credentials can be used by any network application and/or or any client application. In an example, an application can utilize the authentication credentials for default authentication.

Figure 6:
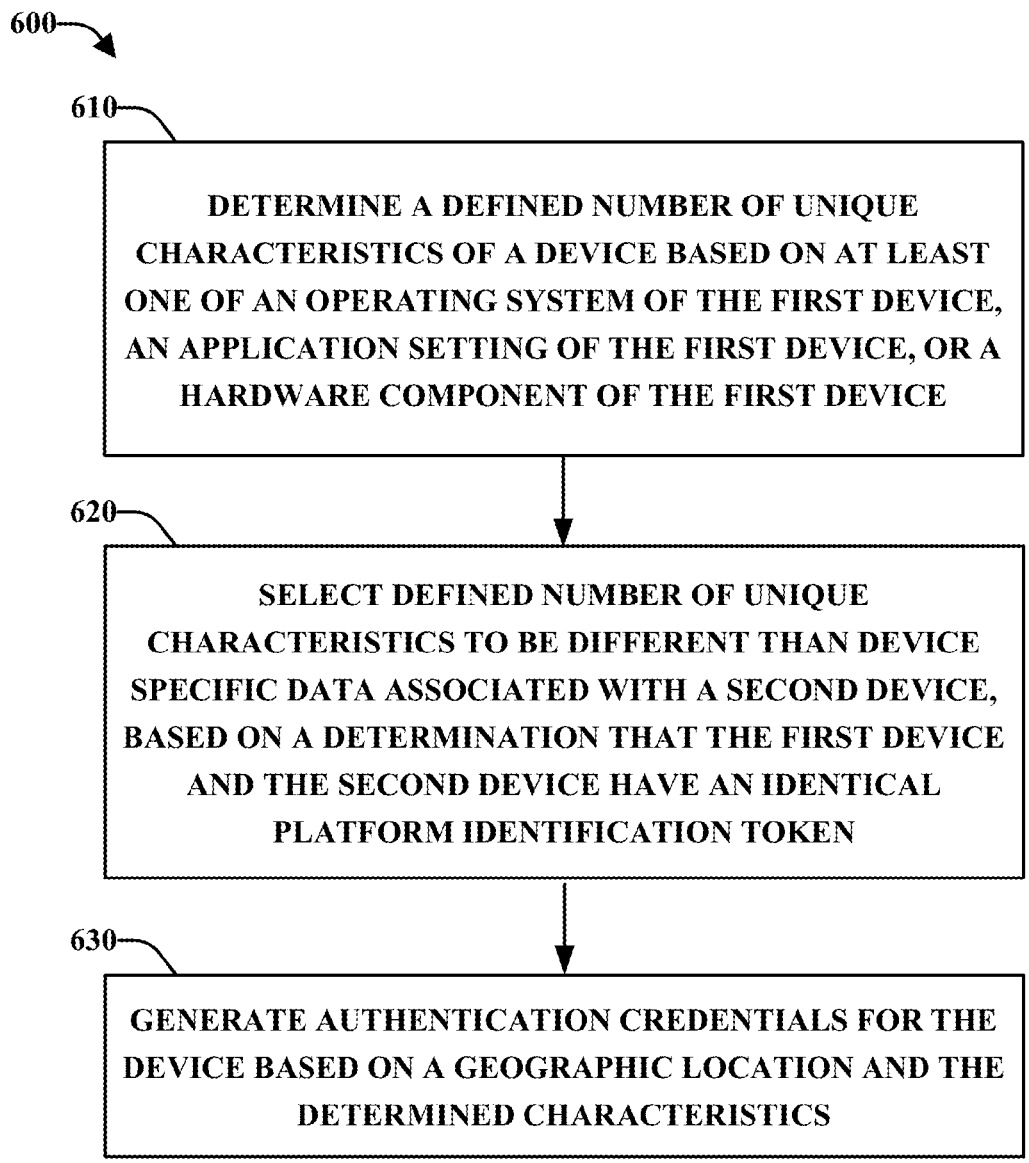
FIG. 6 illustrates a flow diagram of facilitating global authentication of a device including determining identifiers in accordance with various embodiments.

Referring now to FIG. 6, there illustrated is an exemplary method 600 to generate unique authentication credentials (e.g., GUUID) based on determined characteristics of a device. In an aspect, method 600 can generate authentication credentials associated with one or more devices (e.g., client device 120, 220, etc.).

At 610, a defined number of unique characteristics of a device can be determined based on at least one of an operating system of the first device, an application setting of the first device, or a hardware component of the first device. It is noted that the characteristics can include virtually any characteristic of the device. In an aspect, the method 600 can utilize a pre-defined set of characteristics and/or can determine which characteristics to select.

At 620, the defined number of unique characteristics can be selected to be different from device specific data associated with a second device, based on a determination that the first device and the second device have an identical platform identification token. For example, an authentication component can determine a set of characteristics (e.g., identifiers) that uniquely identify the device. In an example, the method 600 can determine a least amount of characteristics that can be used to generate authentication credentials. In another example, the method 600 can determine a least amount of characteristics that can be used to generate authentication credentials with a fault variance, such that future additions of users/devices will not require a new determination.

At 630, authentication credentials for the device, based on a geographic location and the determined characteristics, can be determined. In an aspect, the authentication credentials can be a unique set of bits, string, and the like. In another example, the authentication credentials can be encrypted to protect the credentials. It is noted that various encryption techniques can be applied.

Figure 7:
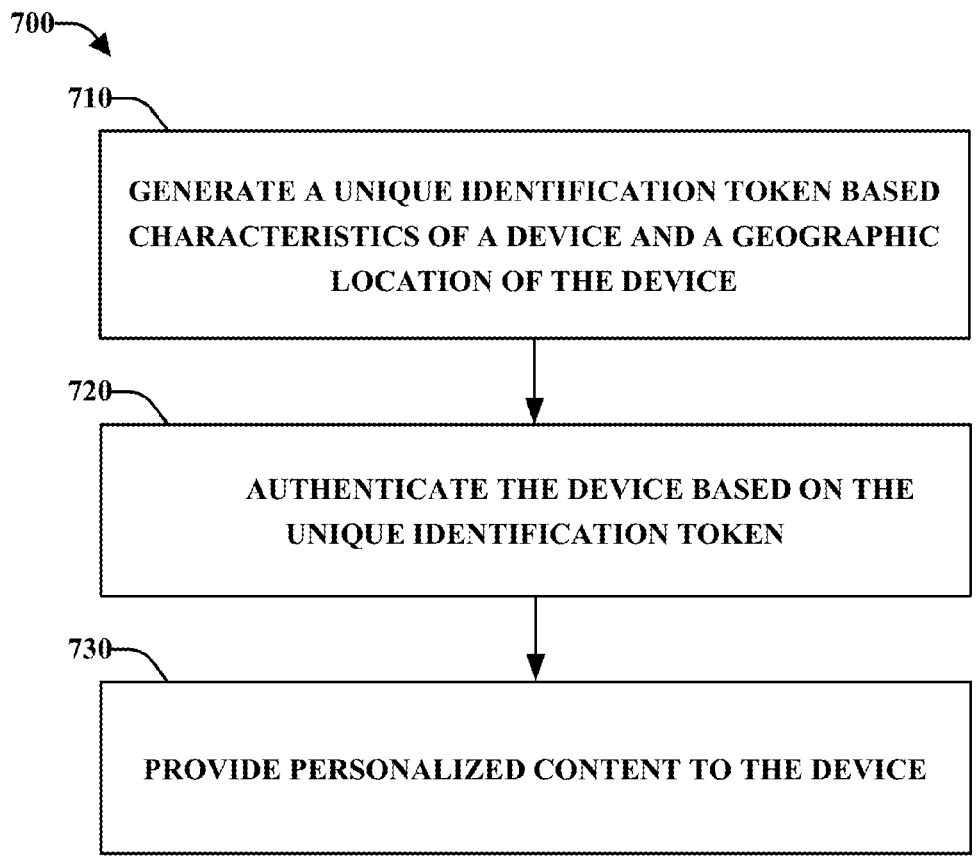
FIG. 7 illustrates a flow diagram of facilitating global authentication of a device within a network in accordance with various embodiments.

Referring now to FIG. 7, there illustrated is an exemplary method 700 to authentication a device (e.g., client device 120, 220, etc.) and provide personalized content based on the authentication, in accordance with various aspects of this disclosure. For example, a user accessing a device can be authenticated (e.g., by an authentication component) and a service (e.g., online retail service) can provide the user with personalized content based on the authentication.

At 710, a unique identification token, based characteristics of a device and a geographic location of the device, is generated. In an aspect, the unique identification token can be a GUUID, a representation of GUUID, and the like. It is noted that the unique identification token can be generated in accordance with various aspects presented herein. In one aspect, a client device and/or a server device can generate a unique identification token.

At 720, the device can be authenticated based on the unique identification token. In various examples, the device can be authenticated based on an OS level authentication, a device level authentication, and the like. It is noted that a unique identification token can be authenticated on additional levels, such as a browser level. For example, a unique identification token can be generated for a set of browser implemented by a device. Websites running on a browser can each share the authentication, such that a user can seamlessly access various websites without the need to provide log in information.

At 730, personalized content can be provided to the device based on the authentication. For example, an online service can provide content to a device that is authenticated. Content can include media content, content in the form of services, advertisements, and the like.

Figure 8:
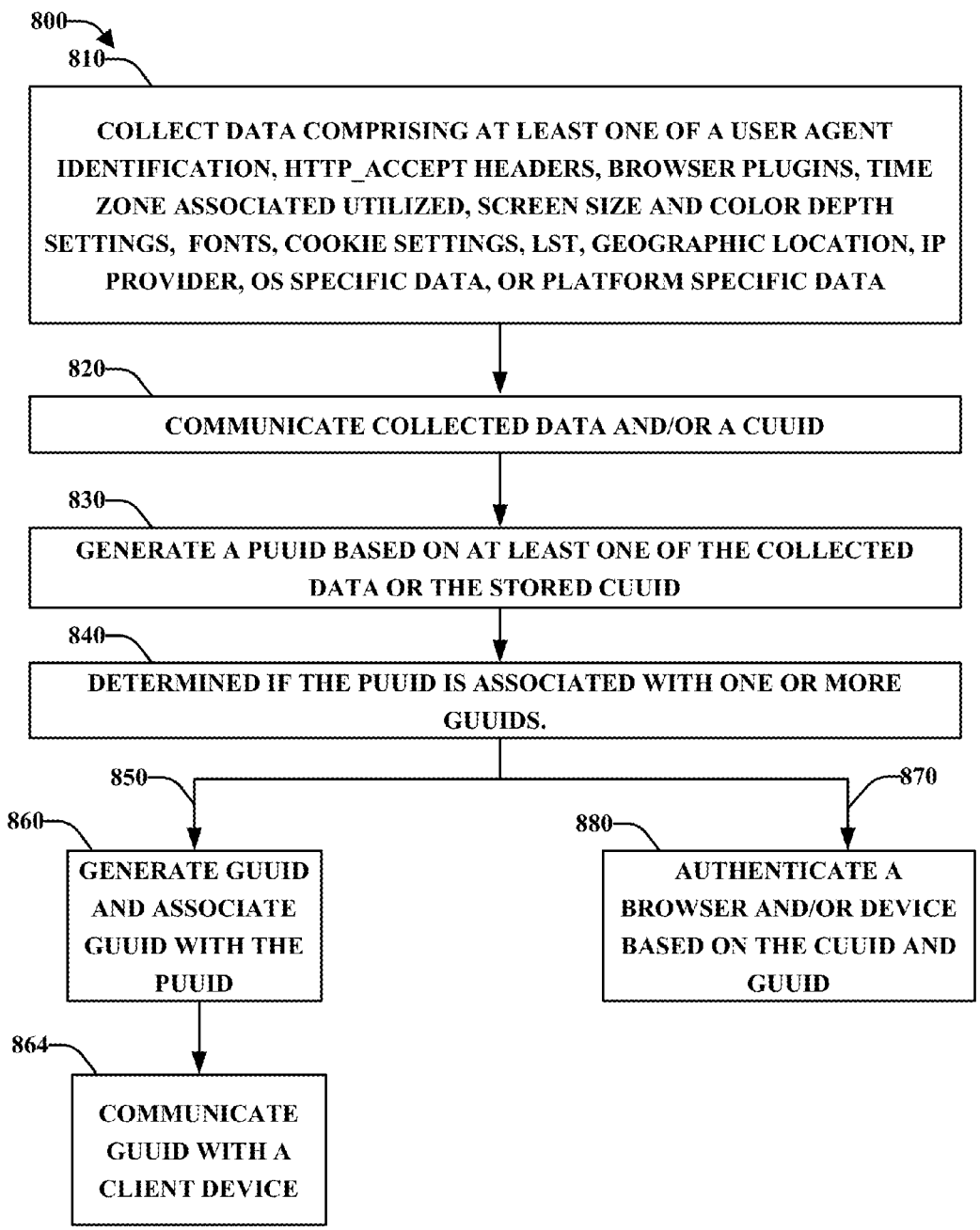
FIG. 8 illustrates a flow diagram of facilitating global authentication of a device to provide personalized content in accordance with various embodiments.

Referring now to FIG. 8, there illustrated is an exemplary method 800 to authentication a device (e.g., client device 120, 220, etc.) and provide personalized content based on the authentication, in accordance with various aspects of this disclosure. For example, a user accessing a device can be authenticated (e.g., by an authentication component) and a service (e.g., online retail service) can provide the user with personalized content based on the authentication.

In an implementation, method 800 employs one or more IDs. It is noted that three IDs are described herein, for illustrative purposes. However, method 800 can utilize more or less IDs. As such, method 800 refers to a GUUID, PUUID, and a CUUID. As used in this example, the GUUID refers to a globally unique identifier assigned to a browser, the PUUID refers to a platform ID generated based on data received from the browser, and a CUUID refers to a globally unique identifier stored on a client device. It is noted that each PUUID can correspond to one or more GUUID.

At 810, it is assumed that a request has been received, such as a request for access to content and/or access to a service (e.g., online retail service). Further, at 810, data can be collected, such as by a client application (e.g., browser). It is noted that an authentication component can instruct a client application to collect data, such as a set of identifiers. The set of identifiers can comprise at least one of the user agent identification, HTTP_ACCEPT headers, browser plug-ins, time zone associated with the client device, screen size and color depth of the client device, fonts associated with the client device, cookie settings (e.g., general cookies enabled/disabled settings, specific cookies that are enabled/disabled, etc.), LST, geographic location, IP provider, OS specific data (e.g., OS name, version, build number, etc.), or platform specific data (e.g., instruction sets of the client device such as, AMD64, Intel 64, etc.). It is noted that various other identifiers can be utilized as disclosed herein.

At 820, the collected data and a stored CUUID (if one exists) can be communicated (e.g., received by an authentication component). In an aspect, the collected data and/or CUUID can be communicated via any available means.

At 830, a PUUID can be generated based on at least one of the collected data or the stored CUUID (if any). In an aspect, the PUUID can be generated based on at least one of the user agent identification, HTTP_ACCEPT headers, browser plug-ins, time zone associated with the client device, screen size and color depth of the client device, fonts associated with the client device, cookie settings (e.g., general cookies enabled/disabled settings, specific cookies that are enabled/disabled, etc.), LST, geographic location, IP provider, OS specific data (e.g., OS name, version, build number, etc.), or platform specific data (e.g., instruction sets of the client device such as, AMD64, Intel 64, etc.).

At 840, it can be determined if the PUUID is associated with one or more GUUIDs. In an aspect, determining if the PUUID is associated with one or more GUUIDs can comprise searching a database (e.g., list, table, etc.) comprising GUUIDs and associated PUUIDs. It is noted that various searching techniques can be applied.

At 850, it is determined that the PUUID is not associated with at least one GUUID. In an aspect, if the PUUID is not associated with at least one GUUID it can be considered a new and/or unique PUUID.

At 860, a GUUID is generated and associated with the PUUID. In an aspect, the GUUID can be generated based on at least one of a received CUUID or received data. In an aspect, if a CUUID was received, the GUUID can be set as the CUUID.

At 864, the generated GUUID is communicated to a client device. In an aspect, communicated the GUUID to the client device can comprise instructing a client device to store the GUUID as a CUUID. As an example, the instructions can include instructions to store the CUUID in any various location, as described herein.

At 870, it is determined that the PUUID is associated with at least one GUUID. In an aspect, the association can be determined based on comparing entries in a data store in the PUUID, for example. In one aspect, a count of GUUIDs associated with the PUUID can be maintained.

At 880, a device and/or browser can be authenticated based on a CUUID (if any) and a GUUID. It is noted that authenticating the device can comprise determining that a received CUUID matches a stored GUUID, determining that a received CUUID does not match a stored GUUID, and/or determining a client does not have a CUUID (e.g., a CUUID was not sent). In another aspect, authentication can include communicated a result to various components, such as a result indicating whether credentials are "valid" and/or "not valid".

Figure 9:
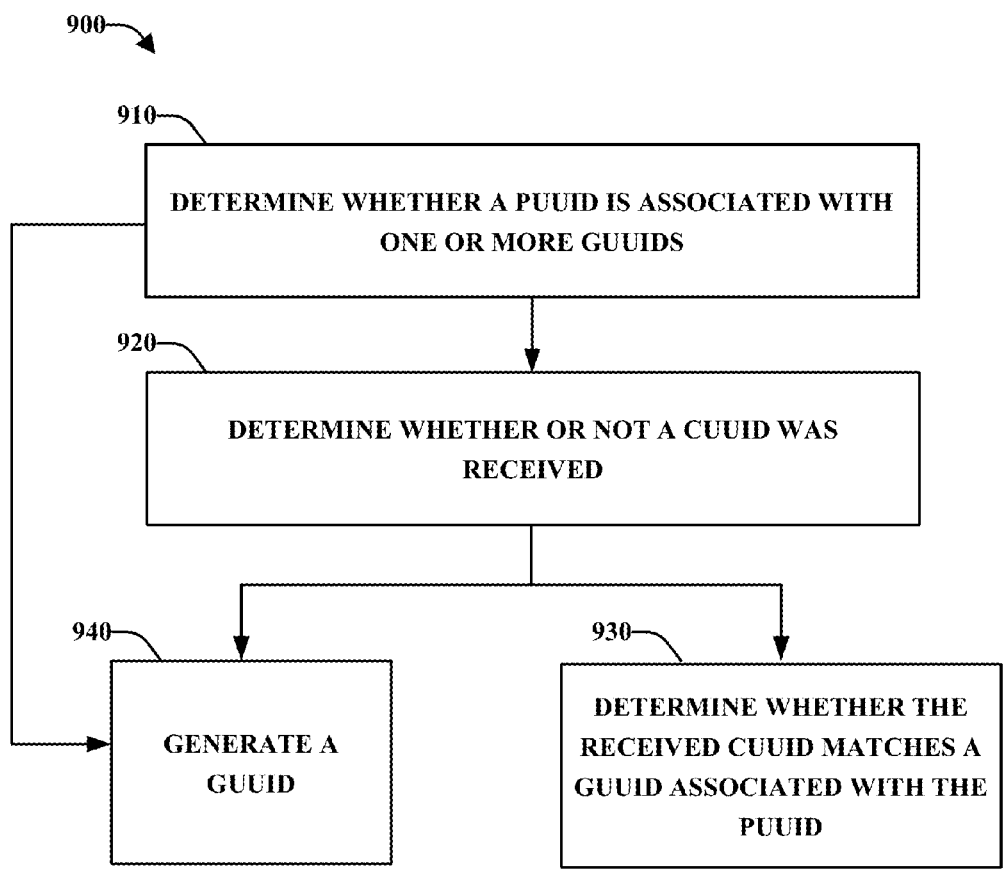
FIG. 9 illustrates a flow diagram of facilitating global authentication of a device to provide personalized content in accordance with various embodiments.

Referring now to FIG. 9, there illustrated is an exemplary method 900 to authentication a device (e.g., client device 120, 220, etc.) and provide personalized content based on the authentication, in accordance with various aspects of this disclosure. For example, a user accessing a device can be authenticated (e.g., by an authentication component) and a service (e.g., online retail service) can provide the user with personalized content based on the authentication. It is noted that method 900 is described with the same set of IDs as method 800 (e.g., GUUID, PUUID, and CUUID). However, it is further noted that the IDs are described herein, for illustrative purposes. As such, method 900 can utilize more or less IDs. Method 900 assumes that data has been communicated (e.g., identifiers), a PUUID has been generated, the PUUID is associated with one or more GGUIDs, and a request has been received, such as a request for access to content and/or access to a service (e.g., online retail service).

At 910, it can be determined whether a PUUID is associated with one or more GUUIDs. For example, determining whether the PUUID is associated with one GUUID or more than one GUUID can comprise searching a database (e.g., list, table, etc.) comprising GUUIDs and associated PUUIDs. It is noted that various searching techniques can be applied. Determining whether the PUUID is associated with one GUUID or more than one GUUID can further comprise maintaining a count of how many GUUIDs are associated with the PUUID. In an aspect, the count can be represented by one or more bits. For example, a "0" can indicate that only one GUUID is associated with the PUUID, while a "1" can indicate that more than one GUUID is associated with the PUUID. In an aspect, if it is determined that a PUUID is not associated with a GUUID, the method 900 can proceed to 940; otherwise, the method can proceed to 920.

At 920, it is determined whether or not a CUUID was received. In an aspect, a CUUID may or may not be sent (e.g., from a client application for example). If it is determined that a CUUID was received, then the method can continue at 930. If it is determined that a CUUID was not received, then the method can continue to 940.

At 930, it is determined whether the received CUUID matches a GUUID associated with the PUUID. In one aspect, determining that the CUUID does match a GUUID associated with the PUUID can result in a device being verified for authentication. If the CUUID does not match a GUUID associated with the PUUID, then the device is not verified and a new GUUID can be generated (and/or associated with the PUUID), and a CUUID can be updated.

At 940, a GUUID can be generated. In an aspect, generating a GUUID can include generating the GUUID based on at least one of received data or the PUUID, associating a GUUID with the PUUID, and the like. In one aspect, if a new GUUID is created a device can be considered as not verified (e.g., no existing profiles exist for a device.

Figure 10:
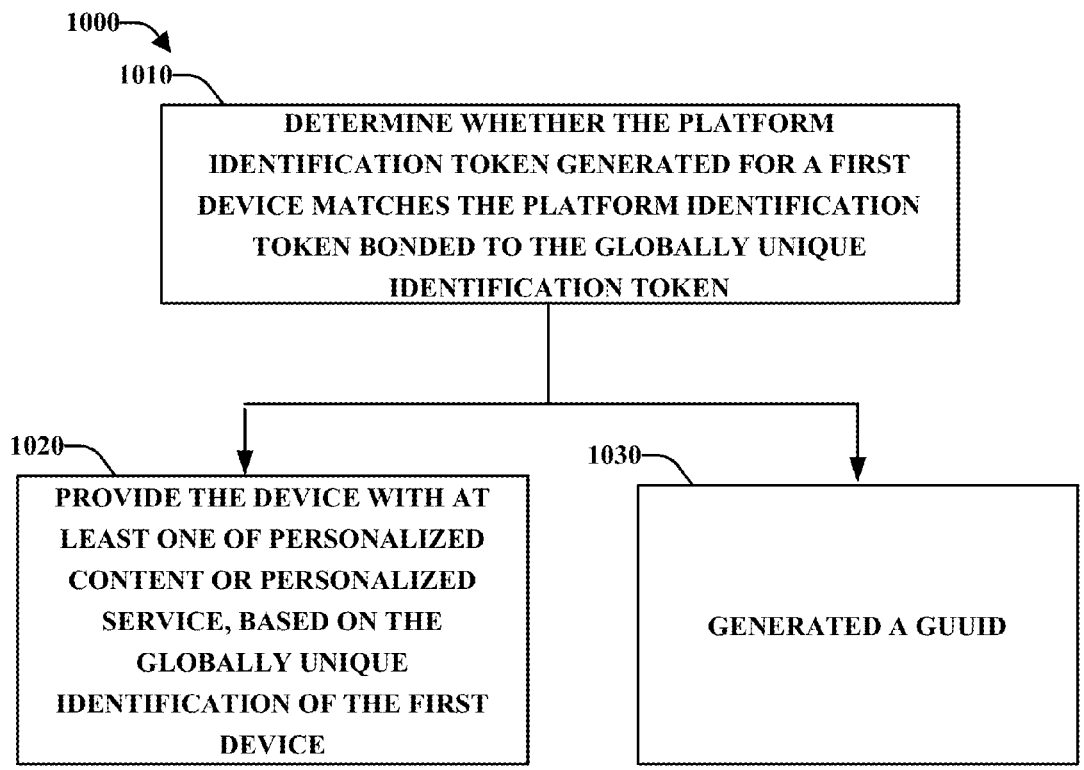
FIG. 10 illustrates a flow diagram of facilitating global authentication of a device to provide personalized content in accordance with various embodiments.

Referring now to FIG. 10, there illustrated is an exemplary method 1000 to authentication a device (e.g., client device 120, 220, etc.) and provide personalized content based on the authentication, in accordance with various aspects of this disclosure. For example, a user accessing a device can be authenticated (e.g., by an authentication component) and a service (e.g., online retail service) can provide the user with personalized content based on the authentication. It is noted that method 1000 is described with the same set of IDs as method 900 (e.g., GUUID, PUUID, and CUUID). However, it is further noted that the IDs are described herein, for illustrative purposes. As such, method 1000 can utilize more or less IDs. Method 1000 assumes that data has been communicated (e.g., identifiers), a PUUID has been generated, the PUUID is associated with one or more GGUIDs, and a request has been received, such as a request for access to content and/or access to a service (e.g., online retail service).

At 1010, it is determined whether a platform identification token generated for a first device matches the platform identification token bonded to the globally unique identification token. In an aspect, determining a platform identification token generated for a first device matches the platform identification token bonded to the globally unique identification token can be determining if a device is verified or is not verified can comprise determining if a GUUID associated with a PUUID matches a CUUID of a device. Various other aspects of this disclosure can be utilized to verify a device.

At 1020, the device can be provided with at least one of personalized content or personalized service, based on the globally unique identification of the first device. For example, a verified device can received content based on records associated with the verified device (e.g., personalized advertisement, cloud computing content, etc.). In another example, a verified device can receive access to services, such as online retail services. As such, a user can bypass a manual registration process with an online retailer.

At 1030, a GUUID can be generated for a not verified device. It is noted that the GUUID can be generated in accordance with various aspects of this disclosure. In one aspect, an unverified device can receive a new GUUID and become newly verified. For example, generating the GUUID can result in verifying a device for future use.

At 1040, personalized data can be monitored. In an aspect, personalized data can include data associated with a GUUID, such as search history, participation in services, account information, access information (e.g., access to content, permission settings of applications), and the like. As an example, a user can purchase content from an online retailer's website (e.g., network application). The online retailer can associate the purchased content with a GUUID.

Figure 11:
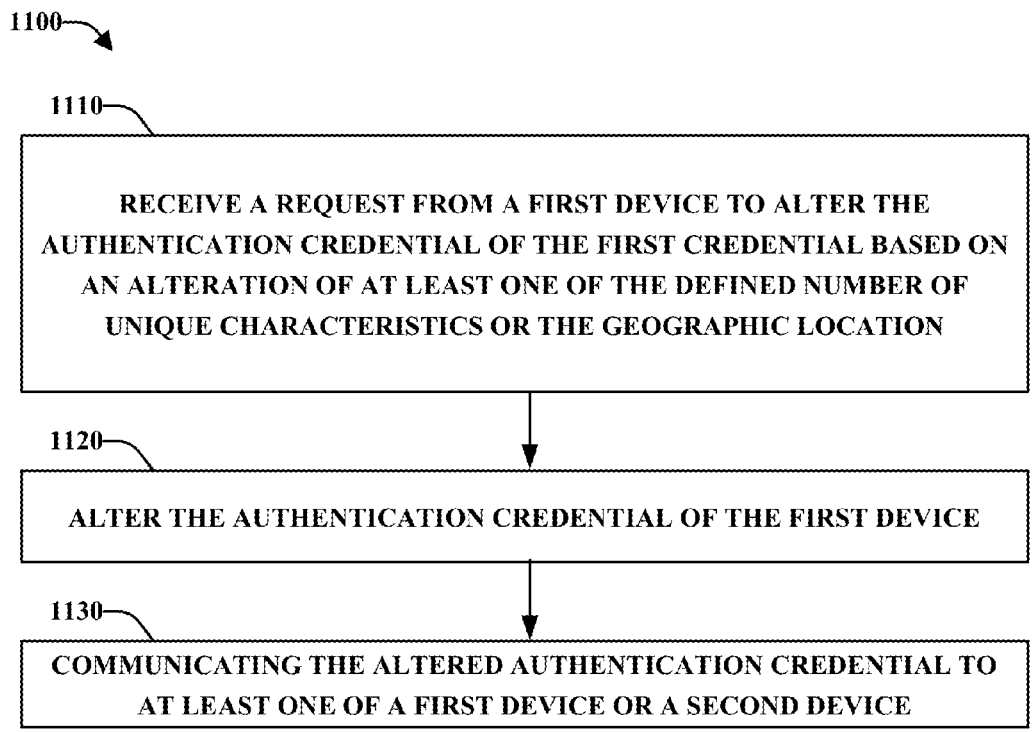
FIG. 11 illustrates a flow diagram of facilitating global authentication of a device to provide personalized content in accordance with various embodiments.

Referring now to FIG. 11, there illustrated is an exemplary method 1100 to authentication a device (e.g., client device 120, 220, etc.) and provide personalized content based on the authentication, in accordance with various aspects of this disclosure. For example, a user accessing a device can be authenticated (e.g., by an authentication component) and a service (e.g., online retail service) can provide the user with personalized content based on the authentication. It is noted that method 1100 is described with the same set of IDs as method 900 (e.g., GUUID, PUUID, and CUUID). However, it is further noted that the IDs are described herein, for illustrative purposes. As such, method 1100 can utilize more or less IDs. Method 1100 assumes that data has been communicated (e.g., identifiers), a PUUID has been generated, the PUUID is associated with one or more GGUIDs, and a request has been received, such as a request for access to content and/or access to a service (e.g., online retail service).

At 1110, a request from a first device to alter the authentication credential of the first credential based on an alteration of at least one of the defined number of unique characteristics or the geographic location can be received. For example, the client device can be altered (e.g., plug-in added/removed, OS version altered, browser altered, geographic location altered etc.). The client device can send a data indicating the alteration, for example to a server and/or authentication component.

At 1120, a stored unique identification token (GUUID) can be altered based on the received update request. As an example, a new GUUID can be generated by an authentication component.

At 1130, the altered unique identification token can be communicated (e.g., to at least one of the device or an application component). In an aspect, communicating the altered unique identification token can allow applications and/or device to authenticate the device even though identifiers have been altered. In one aspect, updating the unique identification token can provide a more robust authentication method and/or system.

Figure 12:
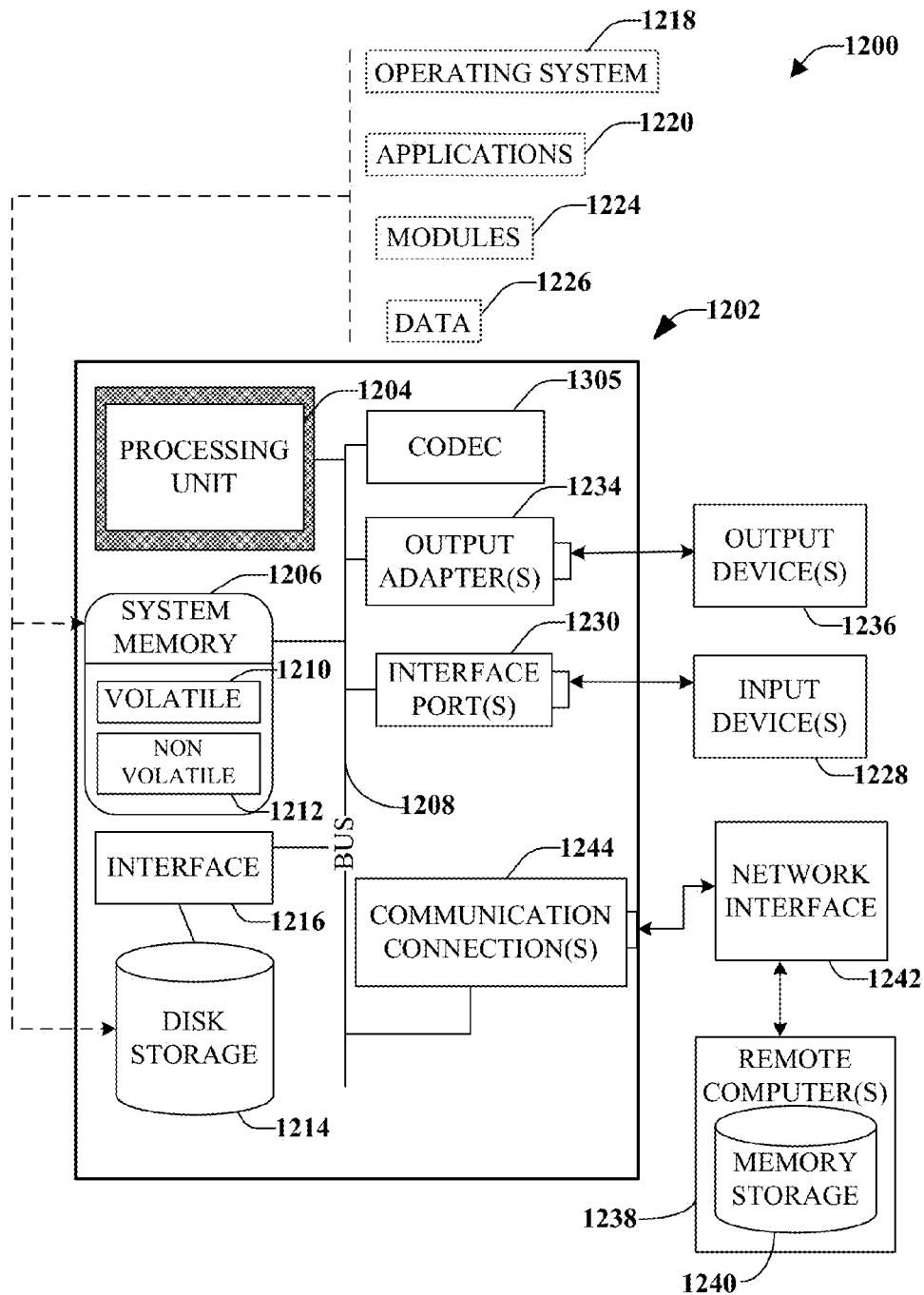
FIG. 12 illustrates a block diagram representing an exemplary non-limiting computing system or operating environment in which one or more aspects of various non-limiting embodiments described herein can be implemented.

Referring now to FIG. 12, there is illustrated a block diagram of a computer operable to provide networking and communication capabilities between a wired or wireless communication network and a server and/or communication device. In order to provide additional context for various aspects thereof, FIG. 12 and the following discussion are intended to provide a brief, general description of a suitable computing environment 1200 in which the various aspects of the various embodiments can be implemented. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

With reference to FIG. 12, a suitable environment 1200 for implementing various aspects of the claimed subject matter includes a computer 1202. The computer 1202 includes a processing unit 1204, a system memory 1206, a codec 1205, and a system bus 1208. The system bus 1208 couples system components including, but not limited to, the system memory 1206 to the processing unit 1204. The processing unit 1204 can be any of various available processors. Dual microprocessors and other multiprocessor architectures also can be employed as the processing unit 1204.

The system bus 1208 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 104), and Small Computer Systems Interface (SCSI).

The system memory 1206 includes volatile memory 1210 and non-volatile memory 1212. The basic input/output system (BIOS), containing the basic routines to transfer information between elements within the computer 1202, such as during start-up, is stored in non-volatile memory 1212. In addition, according to present innovations, codec 1205 may include at least one of an encoder or decoder, wherein the at least one of an encoder or decoder may consist of hardware, a combination of hardware and software, or software. Although, codec 1205 is depicted as a separate component, codec 1205 may be contained within non-volatile memory 1212. By way of illustration, and not limitation, non-volatile memory 1212 can include read only memory (ROM), programmable ROM (PROM), electrically programmable ROM (EPROM), electrically erasable programmable ROM (EEPROM), or flash memory. Volatile memory 1210 includes random access memory (RAM), which acts as external cache memory. According to present aspects, the volatile memory may store the write operation retry logic (not shown in FIG. 12) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 1202 may also include removable/non-removable, volatile/non-volatile computer storage medium. FIG. 12 illustrates, for example, a disk storage 1214. Disk storage 1214 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1214 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1214 to the system bus 1208, a removable or non-removable interface is typically used, such as interface 1216.

It is noted that FIG. 12 describes software that acts as an intermediary between users and the basic computer resources described in the suitable operating environment 1200. Such software includes an operating system 1218. Operating system 1218, which can be stored on disk storage 1214, acts to control and allocate resources of the computer system 1202. Applications 1220 take advantage of the management of resources by operating system 1218 through program modules 1224, and program data 1226, such as the boot/shutdown transaction table and the like, stored either in system memory 1206 or on disk storage 1214. It is noted that the claimed subject matter can be implemented with various operating systems or combinations of operating systems.

A user enters commands or information into the computer 1202 through input device(s) 1228. Input devices 1228 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1204 through the system bus 1208 via interface port(s) 1230. Interface port(s) 1230 include, for example, a serial port, a parallel port, a game port, and a universal serial bus (USB). Output device(s) 1236 use some of the same type of ports as input device(s) 1228. Thus, for example, a USB port may be used to provide input to computer 1202, and to output information from computer 1202 to an output device 1236. Output adapter 1234 is provided to illustrate that there are some output devices 1236 like monitors, speakers, and printers, among other output devices 1236, which require special adapters. The output adapters 1234 include, by way of illustration and not limitation, video and sound cards that provide a means of connection between the output device 1236 and the system bus 1208. It should be noted that other devices and/or systems of devices provide both input and output capabilities such as remote computer(s) 1238.

Computer 1202 can operate in a networked environment using logical connections to one or more remote computers, such as remote computer(s) 1238. The remote computer(s) 1238 can be a personal computer, a server, a router, a network PC, a workstation, a microprocessor based appliance, a peer device, a smart phone, a tablet, or other network node, and typically includes many of the elements described relative to computer 1202. For purposes of brevity, only a memory storage device 1240 is illustrated with remote computer(s) 1238. Remote computer(s) 1238 is logically connected to computer 1202 through a network interface 1242 and then connected via communication connection(s) 1244. Network interface 1242 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1244 refers to the hardware/software employed to connect the network interface 1242 to the bus 1208. While communication connection 1244 is shown for illustrative clarity inside computer 1202, it can also be external to computer 1202. The hardware/software necessary for connection to the network interface 1242 includes, for exemplary purposes only, internal and external technologies such as, modems including regular telephone grade modems, cable modems and DSL modems, ISDN adapters, and wired and wireless Ethernet cards, hubs, and routers.

Figure 13:
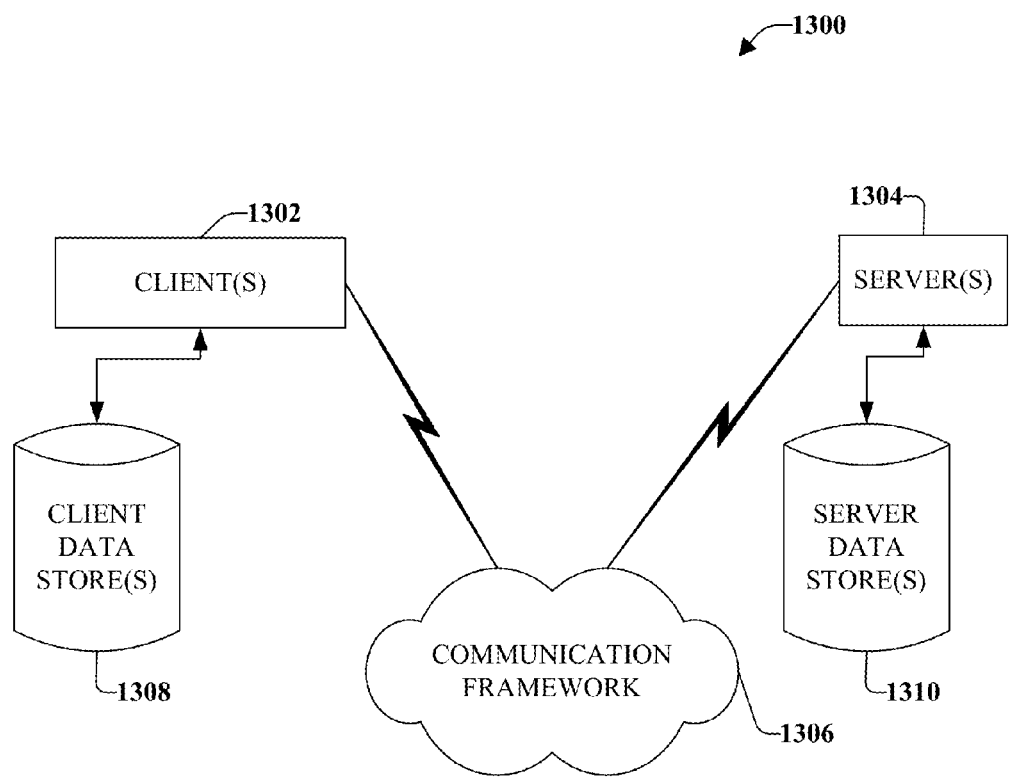
FIG. 13 illustrates a block diagram representing exemplary non-limiting networked environments in which various non-limiting embodiments described herein can be implemented.

Referring now to FIG. 13, there is illustrated a schematic block diagram of a computing environment 1300 in accordance with this specification. The system 1300 includes one or more client(s) 1302 (e.g., laptops, smart phones, PDAs, media players, computers, portable electronic devices, tablets, and the like). The client(s) 1302 can be hardware and/or software (e.g., threads, processes, computing devices). The system 1300 also includes one or more server(s) 1304. The server(s) 1404 can also be hardware or hardware in combination with software (e.g., threads, processes, computing devices). The servers 1404 can house threads to perform transformations by employing aspects of this disclosure, for example. One possible communication between a client 1302 and a server 1304 can be in the form of a data packet transmitted between two or more computer processes wherein the data packet may include video data. The data packet can include a cookie and/or associated contextual information, for example. The system 1300 includes a communication framework 1306 (e.g., a global communication network such as the Internet, or mobile network(s)) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

In one embodiment, a client 1302 can transfer an encoded file, in accordance with the disclosed subject matter, to server 1304. Server 1304 can store the file, decode the file, or transmit the file to another client 1302. It is noted, that a client 1302 can also transfer uncompressed file to a server 1304 and server 1304 can compress the file in accordance with the disclosed subject matter. Likewise, server 1304 can encode video information and transmit the information via communication framework 1306 to one or more clients 1302.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the s and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2300, etc. UTRA includes Wideband-CDMA (W-CDMA) and other variants of CDMA. Further, CDMA2300 covers IS-2300, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.23, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2300 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction, and/or data. Additionally, a computer program product may include a computer readable medium having one or more instructions or codes operable to cause a computer to perform functions described herein.

Further, the actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating there from. Therefore, the disclosed subject matter should not be limited to any single embodiment described herein, but rather should be construed in breadth and scope in accordance with the appended claims below.

What is claimed is:

1. A system, comprising:
   a memory having executable components stored thereon; and
   a processor, communicatively coupled to the memory, configured to execute or facilitate execution of the executable components, the executable components comprising:
   an authentication component configured to at least:
   generate a platform identification token for a first device based on a set of platform specific data of the first device,
   generate a globally unique identification token for the first device based on device specific data comprising at least a geographic location of the first device, a display setting of the first device, an application setting of the first device, and an operating system of the first device,
   instruct the first device to store the globally unique identification token as a client identification token,
   bond the platform identification token to the globally unique identification token, and
   instruct the first device to store the globally unique identification token as the client identification token in any one of a first cookie of the first device, an isolated storage block of the first device, a second cookie represented by red green blue values of auto-generated force-cached of the first device, a portable network graphic image of the first device, a tag to read pixel of the first device, a web history of the first device, a hypertext transfer protocol electronic tag of the first device, a web cache of the first device, a name cache of the first device, the operating system of the first device, a browser of the first device, a markup language session storage block of the first device, a random access memory of the first device, or a globally accessible storage of the first device.

2. The system of claim 1, wherein the authentication component is further configured to generate the globally unique identification token based on at least one of an internet protocol address of the first device, an internet protocol provided by the first device, a font setting of the first device, a cookie setting of the first device, a browser setting of the first device, or a platform specific identifier of the first device.

3. The system of claim 2, wherein the platform specific data comprises at least one of data describing the operating system of the first device, the display setting of the first device, data describing hardware of the first device, or data describing the application setting of the first device.

4. The system of claim 2, wherein the authentication component is further configured to select the device specific data to be different than device specific data associated with a second device, based on a determination that the first device and the second device have an identical platform identification token.

5. The system of claim 1, wherein the authentication component is further configured to store the globally unique identification token.

6. The system of claim 5, wherein the authentication component is further configured to determine whether the platform identification token generated for the first device matches the platform identification token bonded to the globally unique identification token.

7. The system of claim 6, wherein the authentication component is further configured to determine whether a received client identification token of the first device matches the stored globally unique identification token, in response to a determination that the platform identification token generated for the first device matches the platform identification token bonded to the stored globally unique identification token.

8. The system of claim 1, wherein the authentication component is further configured to determine a number of data items represented in the device specific data that results in a set of globally unique identification tokens bonded to the platform identification being unique.

9. The system of claim 1, wherein the executable components further comprise an application component configured to provide the first device with at least one of personalized content or personalized service, based on the globally unique identification of the first device.

10. A method, comprising:
    generating, by a system comprising a processor, a platform identification token for a first device based on a set of platform specific data of the first device;
    generating a globally unique identification token for the first device based on device specific data comprising at least a geographic location of the first device, a display setting of the first device, an application setting of the first device, and an operating system of the first device;
    instructing the first device to store the globally unique identification token as a client identification token;
    bonding the platform identification token to the globally unique identification token; and
    instructing the first device to store the globally unique identification token as the client identification token in any one of a first cookie of the first device, an isolated storage block of the first device, a second cookie represented by red green blue values of auto-generated force-cached of the first device, a portable network graphic image of the first device, a tag to read pixel of the first device, a web history of the first device, a hypertext transfer protocol electronic tag of the first device, a web cache of the first device, a name cache of the first device, the operating system of the first device, a browser of the first device, a markup language session storage block of the first device, a random access memory of the first device, or a globally accessible storage of the first device.

11. The method of claim 10, further comprising generating the globally unique identification token based on at least one of an internet protocol address of the first device, an internet protocol provided by the first device, a font setting of the first device, a cookie setting of the first device, a browser setting of the first device, or the platform identification token of the first device.

12. The method of claim 10, further comprising receiving an authentication credential of the first device and determining whether the authentication credential of the first device matches a stored authentication credential.

13. The method of claim 12, further comprising transmitting at least one of personalized content or a personalized service to the first device based on a determination that the received authentication credential of the first device matches the stored authentication credential.

14. The method of claim 12, further comprising receiving data from the first device, wherein the data comprises a request to alter the authentication credential based on an alteration of at least one of a defined number of unique characteristics or the geographic location.

15. The method of claim 14, further comprising altering the authentication credential of the first device resulting in an altered authentication credential and communicating the altered authentication credential to at least one of the first device or a second device.

16. A non-transitory computer-readable medium comprising executable instructions that, in response to execution, cause a system comprising a processor to perform operations, comprising:
    generating a platform identification token for a device based on a set of platform specific data of the device;
    generating a globally unique identification token for the device based on device specific data comprising at least a geographic location of the device, a display setting of the device, an application setting of the device, and an operating system of the device;
    instructing the device to store the globally unique identification token as a client identification token;
    bonding the platform identification token to the globally unique identification token; and
    instructing the device to store the globally unique identification token as the client identification token in any one of a first cookie of the device, an isolated storage block of the device, a second cookie represented by red green blue values of auto-generated force-cached of the device, a portable network graphic image of the device, a tag to read pixel of the device, a web history of the device, a hypertext transfer protocol electronic tag of the device, a web cache of the device, a name cache of the device, the operating system of the device, a browser of the device, a markup language session storage block of the device, a random access memory of the device, or a globally accessible storage of the device.

17. The non-transitory computer-readable medium of claim 16, wherein the operations further comprise:
    determining a defined number of unique characteristics of the device; and
    generating the client identification token based on the defined number of unique characteristics of the device and the geographic location of the device.

18. The non-transitory computer-readable medium of claim 16, wherein the generating the platform identification token for the device is based on at least first data describing an operating system of the device, a display setting of the device, second data describing hardware of the device, or third data describing an application setting of the device.

19. The non-transitory computer-readable medium of claim 16, wherein the operations further comprise:
    determining whether the platform identification token matches a stored platform specific identification token.

20. The non-transitory computer-readable medium of claim 16, wherein the operations further comprise:
    sending at least one of personalized content or personalized service to the device based on the globally unique identification token of the device.

21. The non-transitory computer-readable medium of claim 16, wherein the operations further comprise:
    wherein the generating the globally unique identification token is based on at least one of an internet protocol address of the device, an internet protocol provided by the device, a font setting of the device, a cookie setting of the device, a browser setting of the device, or the platform identification token of the device.

22. The non-transitory computer-readable medium of claim 16, wherein the operations further comprise:
    determining a number of data items represented in the device specific data that results in a set of globally unique identification tokens, comprising the globally unique identification token, bonded to the platform identification token being unique.

* * * * *